US008862865B2

(12) United States Patent
Gavrilov

(10) Patent No.: US 8,862,865 B2
(45) Date of Patent: Oct. 14, 2014

(54) REBOOTING INFINIBAND CLUSTERS

(75) Inventor: Constantine Gavrilov, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 13/221,093

(22) Filed: Aug. 30, 2011

(65) Prior Publication Data

US 2013/0054947 A1    Feb. 28, 2013

(51) Int. Cl.
*G06F 15/177*  (2006.01)
*G06F 9/44*  (2006.01)

(52) U.S. Cl.
CPC .................................. *G06F 9/4401* (2013.01)
USPC ........................................................... 713/2

(58) Field of Classification Search
CPC .............................. H04L 49/253; H04L 61/00
USPC ........................................................... 713/2
See application file for complete search history.

(56) References Cited

U.S. PATENT DOCUMENTS

| 7,219,343 | B2 | 5/2007 | Almeida et al. | |
| 7,506,335 | B1 | 3/2009 | Wooff et al. | |
| 7,636,774 | B2 * | 12/2009 | van Haalen et al. | 709/221 |
| 7,734,743 | B2 | 6/2010 | Hernandez et al. | |
| 7,886,182 | B1 * | 2/2011 | Coatney et al. | 714/3 |
| 8,484,163 | B1 * | 7/2013 | Yucel et al. | 707/640 |
| 2002/0167898 | A1 * | 11/2002 | Thang et al. | 370/216 |
| 2008/0209018 | A1 | 8/2008 | Hernandez et al. | |
| 2008/0209450 | A1 | 8/2008 | Hernandez et al. | |

OTHER PUBLICATIONS

Bull Cedoc, "InfiBand Guide—Extreme Computing," Reference 86 A2 42FD 00, Jul. 2009, 132 pages.
"ofed Roll: Users Guide—Rocks+," Clustercopr.com, Version 5.3 Edition, Mar. 2010, 19 pages.
IBM, "System p And eServer pSeries—Clustering systems using InfiniBand hardware," Third Edition, Sep. 2007, 258 pages.

* cited by examiner

*Primary Examiner* — Kim Huynh
*Assistant Examiner* — Eric Chang
(74) *Attorney, Agent, or Firm* — Griffiths & Seaton PLLC

(57) ABSTRACT

Methods, systems, and physical computer-readable storage media are now provided that reduce latency and improve efficiency of a system after reboot of an Infiniband (IB) cluster. A method of rebooting an Infiniband cluster includes preserving routing table configurations of each switch of the Infiniband cluster, rebooting endpoints of the Infiniband cluster, activating physical links at each endpoint, setting local identifier (LID) locally at each endpoint of the IB cluster, and activating logical links locally at each endpoint of the IB cluster.

20 Claims, 2 Drawing Sheets

REBOOTING INFINIBAND CLUSTERS

BACKGROUND OF THE INVENTION

1. Field of the Invention

The present invention relates in general to Infiniband networks, and in particular, to rebooting Infiniband clusters.

2. Description of the Related Art

InfiniBand is an industry standard architecture that may be used for interconnecting systems in cluster configurations, by providing a channel-based, switched-fabric technology. In such a configuration, data may be transmitted via messages which are made up of packets. Each device, whether processor or I/O, may include a channel adapter. The messages are typically transmitted from one device's channel adapter to another device's channel adapter via switches. The Infini-Band architecture is described in "InfiniBand Architecture Specification Vol. 1-2." October 2004, Release 1.2, which is herein incorporated by reference in its entirety.

An InfiniBand network may also include a number of management entities, such as a Subnet Managers (SM). Typically, the Subnet Manager is an entity that runs on one of the nodes in the Infiniband network and is responsible for configuration of the network. For example, a Subnet Manager handles the dynamic addition and removal of nodes from the network.

SUMMARY OF THE INVENTION

Generally, the subnet manager uses management datagram (MAD) packets sent via direct route to discover nodes, assign local identifier addresses, and configure routing tables on switches. NodeInfo and PortInfo MAD packets are sent to discover new or lost endpoints. If a new endpoint is discovered, a new LID is chosen, a set LID command is sent to the new endpoint. Then, a switch routing table update is sent, and the switch port and the new endpoint are requested to go to ARMED and ACTIVE logical state. If a lost endpoint is discovered, a switch routing table update is sent, and the switch port is requested to switch to INIT logical state.

After reboot of an Infiniband cluster, the above described discovery and setup of each node may take a relatively significant amount of time. For example, because the subnet manager wants to discover the every destination endpoint in Infiniband network to configure routine tables, such discovery may delay routing table updates and set link ACTIVE for the switch port and discovered endpoints. Additionally, internal architecture of existing implementations assumes sending a number of discovery commands and waiting for an answer (or timing out) before configuration. Such actions may inadvertently block on ports which have not become physically active or are in the process of loading driver services. Moreover, selecting a node to be a master and to act as subnet manager may be relatively time consuming when communications timeout.

Methods, systems, and physical computer-readable storage media are now provided that reduce latency and improve efficiency of a system after reboot of an Infiniband cluster. In an embodiment, by way of example only, a method of rebooting an Infiniband cluster is provided and includes preserving routing table configurations of each switch of the Infiniband cluster, rebooting endpoints of the Infiniband cluster, activating physical links at each endpoint, setting local identifier (LID) locally at each endpoint of the Infiniband cluster, and activating logical links locally at each endpoint of the Infiniband cluster.

In another embodiment, by way of example only, an Infiniband cluster system includes a plurality of nodes including endpoints and at least one switch connecting at least two nodes, wherein each endpoint is adapted to reboot and to set a corresponding local identifier, and each endpoint is configured to activate a corresponding logical link.

In still another embodiment, by way of example only, a physical computer-readable storage medium is provided comprising a computer program product method for rebooting an Infiniband cluster. The physical computer-readable storage medium includes computer code for preserving routing table configurations of each switch of the Infiniband cluster, computer code for rebooting endpoints of the Infiniband cluster, computer code for activating physical links at each endpoint, computer code for setting local identifier (LID) locally at each endpoint of the Infiniband cluster, and activating logical links locally at each endpoint of the Infiniband cluster.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods, systems, and physical computer-readable storage media that reduce latency and improve efficiency of a system after reboot of an Infiniband cluster. Generally, the method includes preserving routing table configurations of each switch of the Infiniband cluster, rebooting endpoints of the Infiniband cluster, activating physical links at each endpoint, and setting local identifier (LID) locally, and activating logical links locally at each endpoint of the Infiniband cluster.

Figure 1:
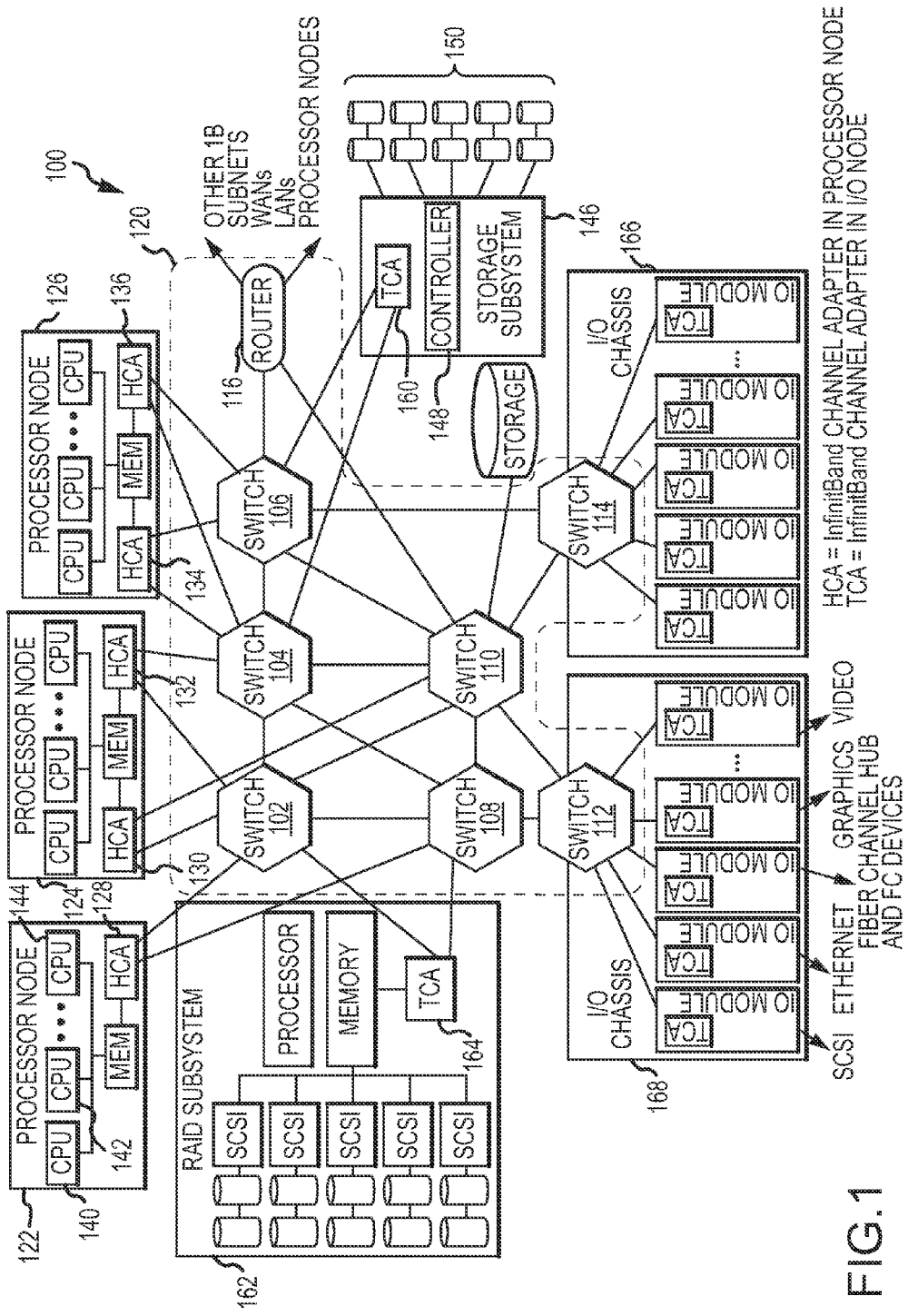
FIG. 1 illustrates a Infiniband network, according to an embodiment.

InfiniBand implementations may be found in servers, server clusters, embedded computing systems and in both block and file based storage systems. FIG. 1 illustrates an exemplary InfiniBand implementation 100. Switches 102-114 and a router 116 form the subnet 120. Multiple processor nodes 122-126 may be connected to switches within the subnet 120 through InfiniBand host channel adapters 128-136 to form a cluster. Although a single cluster is shown, multiple clusters, each including multiple processor nodes similar to nodes 122-126, can be connected to switches within the subnet 120 in other embodiments. One of the nodes of subnet 120 hosts a subnet manager node. For example, end node 108 includes a subnet manager 130 and subnet administrator and its database 132. Subnet manager 130 is used for discovery, configuration, and initialization of the fabric. In an embodiment, subnet manager 130 configures host channel adapters 128-136 with the local addresses for each associated physical port, i.e., the port's LID. Although the subnet manager 130 is generally depicted, in some embodiments it may be contained within a server, a console, a processor node, a storage subsystem, an I/O chassis or in another device connected to the subnet 120.

As illustrated by processor Node 122, a processor node may contain multiple CPUs 140-144 and may have a single InfiniBand host channel adapter 128. As depicted, the host channel adapter 128 may be connected to both switch 102 and switch 108. As illustrated by processor node 124, a processor node may contain more than one host channel adapter 130 and 132 connected to different switches 102 and 104.

Each host channel adapter 128-136 may have a globally unique identifier (GUID) that is assigned by the channel adapter vendor. According to an embodiment, local identification numbers assigned by the subnet manager are static (i.e., they do not change from one power cycle to the next). Additionally, each port may have a port GUID assigned by the manufacturer. Each port or node may be referred to herein as an "endpoint."

Every destination within the subnet 120 may also be configured with one or more unique local identifiers (LIDs), which are statically assigned to each destination endpoint. In an embodiment, in order to maintain static assignment of the LIDs to each destination endpoint, the subnet manager 130 is provided with a mapping table including a mapping of GUIDs to corresponding LIDs. In another embodiment, the mapping table includes a mapping of LID assignments based on switch and port locations that are discoverable by both the subnet manager 130 and the destination endpoints. In still another embodiment, software logic defines a predetermined process for assigning LIDs and corresponding GUIDs.

Packets may contain a destination address that specifies the LID of the destination. From the point of view of a switch, a destination LID may represent a path through the switch. Switches 102-114 may be configured with routing tables and an individual packet may be forwarded to an output port based on the packet's destination LID and the switch's forwarding table.

Switches 102-114 may primarily pass packets along based on a destination address within the packet's local route header. Switches 102-114 may also consume packets required for managing the switches 102-114 themselves. Optionally, a switch port may incorporate the properties of a physical InfiniBand host channel adapter. Switches 102-114 may also support delivery of a single packet to a single destination as well as the delivery of a single packet to multiple destinations.

Various types of storage devices may also be connected to switches within the subnet 120. A storage subsystem 146 containing a storage capacity 150, a controller 148 and an InfiniBand host channel adapter 160 may be connected to switches 104 and 106. A RAID storage subsystem 162 may also be connected via InfiniBand host channel adapter 164 to switches 108 and 102 within the subnet 120. As well as the storage subsystems 146 and 162, I/O chassis 166 and 168 may be connected to switches 112 and 114 respectively.

Figure 2:
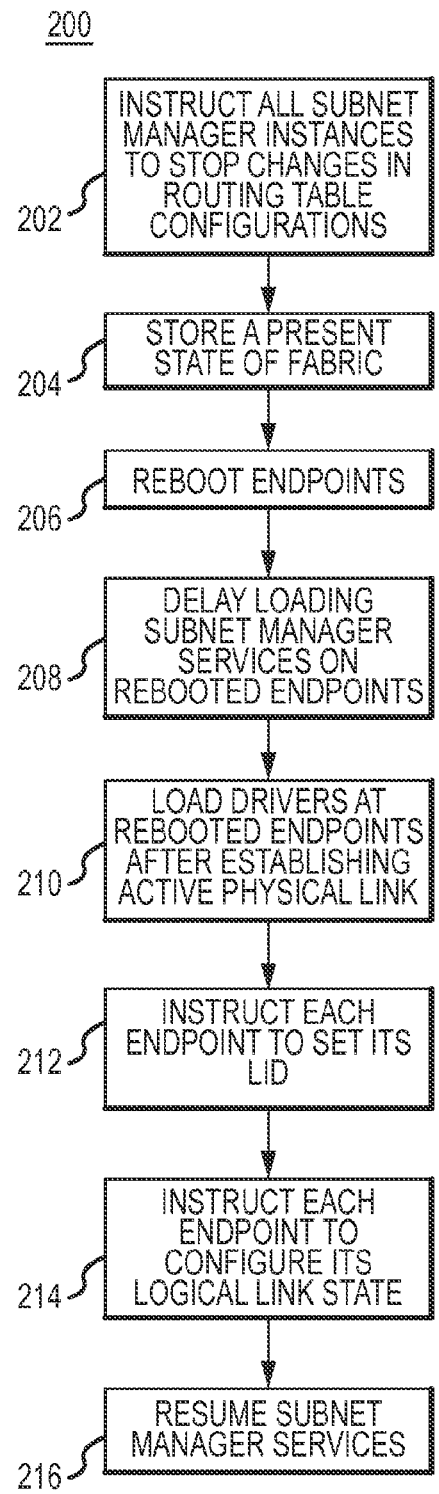
FIG. 2 is a flow diagram of an endpoint reboot process, according to an embodiment.

During operation, one or more of the clusters may reboot. In such case, the subnet manager 130 may initiate endpoint discovery on the cluster. FIG. 2 is a flow diagram of an endpoint reboot process 200, according to an embodiment. To begin, all subnet manager instances are instructed to stop changes in routing table configurations, step 202. As noted above, routing tables are associated with the switches (e.g., switches 102-114), and thus, the subnet manager terminates changing entries (e.g., deleting, updating, adding) in the routing table. As a result, the routing table at each switch is preserved at a given instance. Additionally, a present state of fabric is temporarily stored, step 204. In an embodiment, the present state of fabric includes all endpoints discovered by the subnet manager at the given instance and can be stored in a local memory of the node acting as the subnet manager. The state of fabric includes a mapping to each GUID with a corresponding LID. For example, the local memory can comprise a random access memory (RAM) or file systems.

Next, the endpoints are rebooted, step 206. According to an embodiment, all of the endpoints that were discovered by the subnet manager are rebooted. In an example, the cluster undergoes a re-boot process by which firmware prepares the cluster for operation by identifying and setting up/initiating endpoints in the cluster. During the re-boot process, the firmware recognizes the presence of the IB HCA and one or more IB-end node devices. Additionally, the firmware describes user configuration choices and contains firmware device drivers for hardware devices and support routines for use by those drivers. In any case, loading of subnet manager services are delayed on rebooted endpoints, step 208.

While the subnet manager services remains suspended, each rebooted endpoint loads the drivers, step 210. After the drivers are loaded by a node, a physical link is established. In an embodiment, the nodes can include ports that may be in a number of physical states, including LinkDown, Sleep, Polling, Disabled, Port Configuration Training, LinkUp, LinkErrorRecovery and Physical Test. The physical state of a port may be represented by PortPhysicalState, which is an architected state that reflects whether the port is physically connected to the subnet. The LinkUp state represents an "electrically connected" state and all other states represent an "electrically disconnected or connecting" state, LinkDown. The LinkUp state typically indicates a port of the node is available to transmit packets, while a LinkDown state typically indicates the port is not available to transmit packets. When the port is in a LinkUp state, the physical link between the node and the subnet becomes active.

Next, each endpoint will set its LID, step 212. In these regards, the driver instructs the node to send out a local MAD packet to set the LID. As alluded to above, the LID may have been previously assigned by the subnet manager, and hence, the node may have a pre-determined LID, in an embodiment. In another embodiment, the driver may include logic that is similar to that of the subnet manager for assigning LIDs. Consequently, the driver can predict its own LID assignment. Then, each endpoint will configure its logical link state to active, step 214. In an embodiment, the driver may instruct the node to send MAD packets requesting that a switch port and an endpoint connected to the switch port go to an ARMED logical state. After the switch port and endpoint are ARMED, MAD packets are sent to change the switch port and the endpoint to an ACTIVE logical state. Physical and logical activation allows the endpoint to communicate with other activated endpoints.

Subnet manager services are resumed, step 216. In an embodiment, subnet manager services are delayed for a predetermined duration. For example, the predetermined duration can be a few seconds to minutes. In any case, when services resume, the subnet manager is provided with the fabric state saved previously and operate in a special upgrade mode. The special upgrade mode allows the subnet manager to update the previously preserved routing table only if it identifies missing or new endpoints. In another embodiment, the special upgrade mode allows additional time for the subnet manager to discover missing or new endpoints before timing out. According to another embodiment, routing updates for newly discovered nodes are performed such that other nodes are not erased.

By performing the above process, the time required to reboot an Infiniband network is decreased as compared to employing conventional reboot processes. In particular, preserving the routing table prior to endpoint reboot, delaying subnet manager service starts, and performing LID assignment and link activation locally improves the reboot process.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. An Infiniband cluster system comprising:
a plurality of nodes including endpoints; and
at least one switch connecting at least two nodes,
wherein:
each endpoint includes a processor, and
during an Infiniband cluster system reboot, each endpoint locally sets a corresponding local identifier and activates a corresponding logical link.

2. The IB cluster system of claim 1, wherein the at least one switch includes a routing table.

3. The IB cluster system of claim 1, wherein at least one node of the plurality of nodes comprises a subnet manager provided with a mapping table including LIDs assigned to corresponding GUIDs.

4. A method of rebooting an Infiniband cluster, the method comprising:
preserving routing table configurations of each switch of the Infiniband cluster;
rebooting endpoints of the Infiniband cluster;
activating physical links by each rebooted endpoint;
setting local identifier (LID) locally by each endpoint; and
activating logical links locally by each endpoint.

5. The method of claim 4, further comprising storing a present state of fabric before the step of rebooting.

6. The method of claim 4, further comprising initiating subnet manager services on the rebooted endpoints, after the steps of setting LID and activating logical links locally.

7. The method of claim 4, further comprising loading drivers on the rebooted endpoints, after the step of rebooting.

8. The method of claim 4, wherein the step of activating logical links locally comprises sending a local MAD packet to set the LID.

9. The method of claim 8, wherein the step of activating logical links locally further comprises sending MAD packets to switch a port and corresponding endpoint connected to the port to ARMED logical state.

10. The method of claim 9, wherein the step of activating logical links locally further comprises sending MAD packets to switch a port and corresponding endpoint connected to the port to ACTIVE logical state.

11. The method of claim 4, further comprising initiating subnet manager services after the steps of setting LID and activating logical links.

12. The method of claim 11, further comprising storing a present state of fabric before the step of rebooting, and providing the present state of fabric to the subnet manager after the steps of setting LID and activating logical links.

13. The method of claim 11, further comprising updating the routing table of the switch after discovering one of a new endpoint and a previously-known endpoint.

14. The method of claim 4, further comprising locally predicting a LID associated with a global unique identifier of a corresponding endpoint, before the steps of setting LID and activating logical links.

15. The method of claim 4, further comprising providing a mapping table to the subnet manager, the mapping table including global unique identifiers of each endpoint to a corresponding LID.

16. A non-transitory physical computer-readable storage medium comprising a computer program product method for rebooting an Infiniband cluster, the physical computer-readable storage medium comprising:
  computer code for preserving routing table configurations of each switch of the Infiniband cluster;
  computer code for rebooting endpoints of the Infiniband cluster;
  computer code for activating physical links by each endpoint; and
  computer code for setting local identifier (LID) locally by each endpoint of the Infiniband cluster; and
  computer code activating logical links locally by each endpoint of the Infiniband cluster.

17. The non-transitory physical computer-readable storage medium of claim 16, further comprising computer code for storing a present state of fabric before the step of rebooting.

18. The non-transitory physical computer-readable storage medium of claim 16, further comprising computer code for initiating subnet manager services on the rebooted endpoints.

19. The non-transitory physical computer-readable storage medium of claim 16, further comprising computer code for loading drivers on the rebooted endpoints.

20. The non-transitory physical computer-readable storage medium of claim 16, further comprising computer code for initiating subnet manager services.

* * * * *